Nov. 20, 1956 F. B. BELLON ET AL 2,770,890

MAGNETIC ELEMENT FOR APPARATUS DESIGNED TO DETERMINE THE DIRECTION OF A MAGNETIC FIELD

Filed Nov. 24, 1953 4 Sheets-Sheet 1

INVENTORS

FRANCOIS BAPTISTIN BELLON AND JACQUES L. M. H. LENOIR

By: Hinderoth, Lind & Ponack
Attorneys

INVENTORS:
FRANCOIS BAPTISTIN BELLON AND
JACQUES L. M. H. LENOIR
BY:

INVENTORS
FRANCOIS BAPTISTIN BELLON AND
JACQUES L.M.H. LENOIR
By: Haseltine, Lake & Co. [handwritten: Sendroth, Lind & Ponack]
Attorneys INVENTORS:
FRANCOIS BAPTISTIN BELLON AND
JACQUES L. M. H. LENOIR
BY:
Wenderoth, Lind & Ponack
Attorneys 2,770,890

MAGNETIC ELEMENT FOR APPARATUS DESIGNED TO DETERMINE THE DIRECTION OF A MAGNETIC FIELD

François Baptistin Bellon, Paris, and Jacques Louis Marie Henry Lenoir, Viroflay, France Application November 24, 1953, Serial No. 394,132

7 Claims. (Cl. 33—222)

This invention relates to improvements in compasses utilizing the earth's magnetic field and notably in the sensitive units, correctors and field measuring apparatus provided with these compasses.

The object of these improvements is to eliminate or reduce to the maximum the harmonic deviations resulting from the magnetic masses of correctors positioned in close proximity to the sensitive member of the compass, as well as any other proximity effect caused for example by the magnetic hysteresis of the different magnetic component elements of the compass.

One drawback of magnetic compasses is due to the fact that, owing to the relatively important volume of the sensitive element and the lack of uniformity of the magnetic field within this volume on account of the irregular structure of the fields produced by the correctors, according to the heading of the vehicle or ship on which the compass is mounted, deviations occur which cannot be cancelled or compensated, these deviations being known under the name of sextantal, octantal deviations, etc., but more generally under the name of harmonic or proximity harmonic deviations.

A conventional method of reducing these deviations consists in using elongated magnets, disposed by identical pairs in parallel relationship for constituting the sensitive elements of the compasses, the semi-circular correctors and the field measuring apparatus, so that the poles of all magnets constituting either the sensitive element, either of the semi-circular correctors, or the field measuring apparatus, are on a common circle and the poles of each pair form an adequate angle with the centre of the circle.

Now it is the essential purpose of this invention to replace all these magnets constituting the sensitive element, the correctors or the magnets of the measuring instrument with a magnetic body having the shape of a body of revolution whose magnetization is throughout its entire volume of the same intensity and of the same direction, said direction being perpendicular to the axis of revolution of said magnetic body.

This invention makes it possible to design new types of precision compasses which possess all or part of the following advantages:

Reduced size: owing in particular to the elimination of proximity harmonics, the use of hysteresis-free induction correctors, the existence of points of zero-field in the vicinity of the compass and, therefore, the presence of low-field areas in the vicinity of such points;

Continuously-variable correctors: all the correcting units provide for progressive variation in the amplitude and phase in the geometrical angular sense of their correction effects;

Low periods of oscillation: this results from the use of elements having a high magnetic moment relative to the moment of inertia, which promotes the damping action of eddy-currents, and makes it possible to avoid all the shortcomings and limitations of conventional liquid-damping means;

Ideal static and dynamic balancing: owing in particular to proper arrangement of the sensitive element;

Reinforced director field: this results from the use of astatic inductor systems free from hysteresis and suitably disposed.

The invention will be fully understood from the ensuing theoretical discussion and description of the various devices used for carrying out the invention, and from the accompanying drawings, it being understood that the said description and drawings are given by way of non-restrictive examples.

Figs. 5–5*a* and 6–6*a* are vertical sectional and plan views respectively of sensitive elements for fluid-type compasses.

Figure 7:
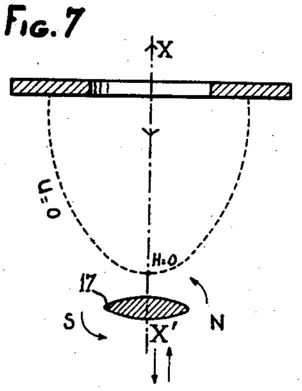

Fig. 7 shows a correcting magnet arrangement.

Figs. 8 to 10*a* are devices serving to reinforce the director field and annul the constant deflection factor.

Figure 11:
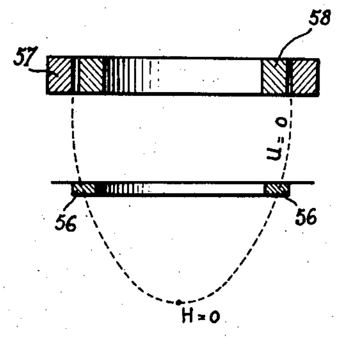

Fig. 11 is a field-measuring device in a vertical section.

Figure 12:
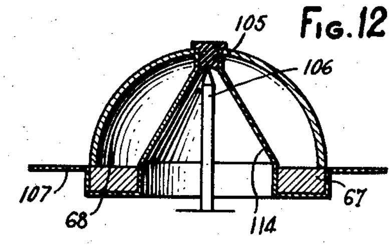
Figure 13:
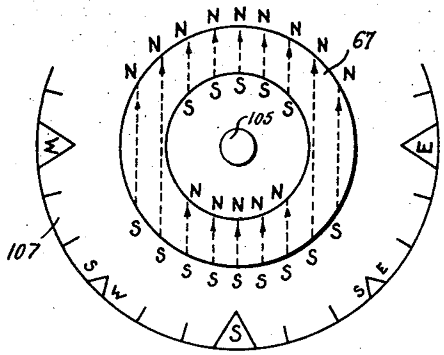

Figs. 12 and 13 show one form of embodiment of a sensitive element for a compass.

Figure 14:
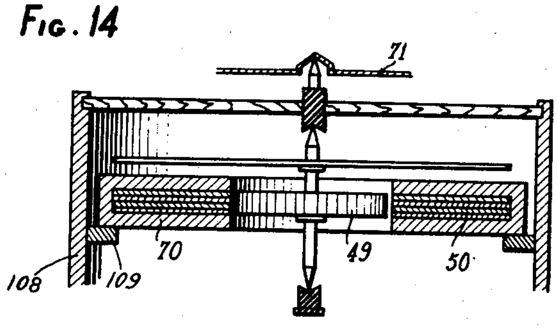

Fig. 14 shows one example of a magnetic compass with an astatic field-reinforcing system.

Figures 15, 16, 18:
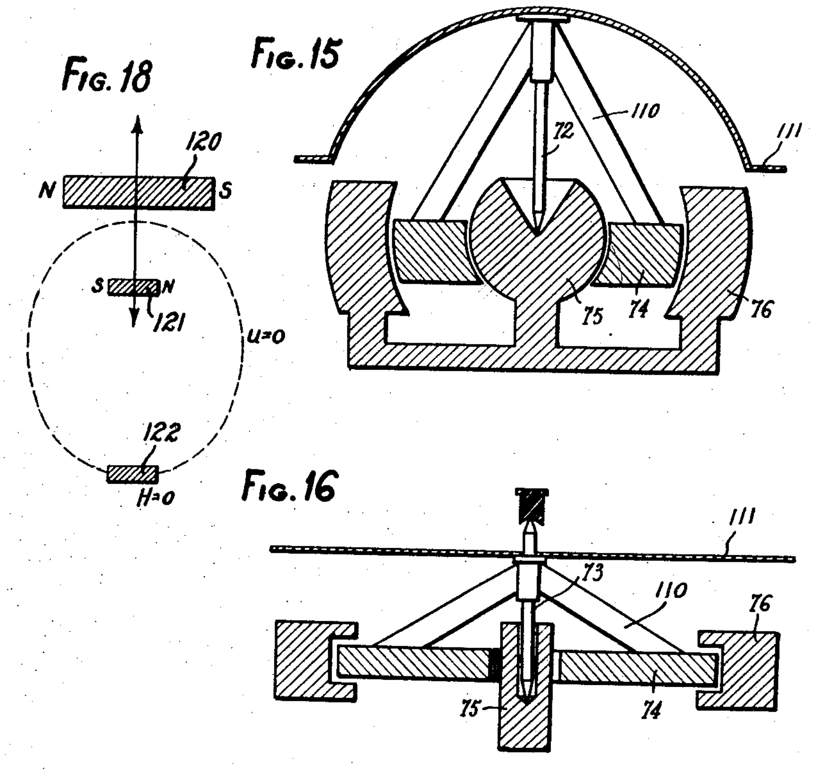

Figs. 15 and 16 show examples of magnetic compasses provided with eddy-current damper means.

Figure 17:
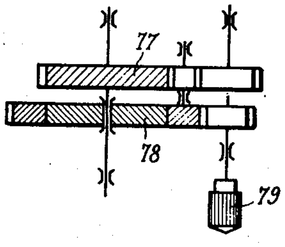

Fig. 17 is an example of a control unit for varying the resultant effect of two correcting elements.

Figure 18 is a schematic view of an arrangement for a magnetic compass whose sensitive element is formed by two coaxial magnetic elements.

Figure 1:
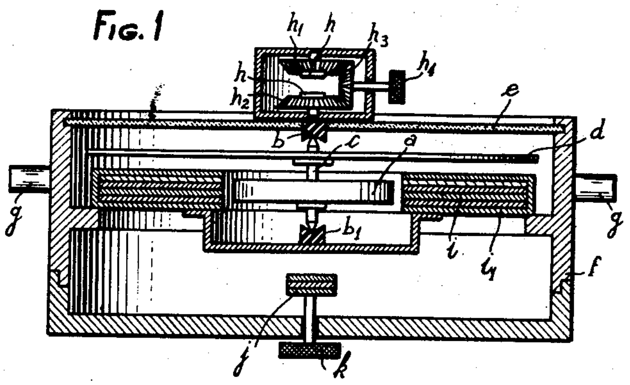
Fig. 1 is a vertical section showing a compass made in accordance with the teachings of this invention and utilizing the earth's magnetic field.

Fig. 1 shows in axial section a magnetic compass of the so-called dry type, without the Flinders-bar. The sensitive rotary member *a* is pivotally mounted between a pair of bearings *b* and $b_1$. The pivot pin *c* of the sensitive rotary member is fast with the compass-card *d* and the heading is read through the glass *e* forming the top wall of the compass case *f* mounted on gimbals through trunnions *g*.

The sensitive member *a* is corrected for the semi-circular deviation by corrector *h*. Each corrector is mounted on a bevel gear $h_1$, $h_2$ meshing with a common bevel pinion $h_3$ adapted to be actuated from outside the case in which they are enclosed, for example by means of an adjustment knurled button $h_4$.

The arrangement also comprises a field reinforcing sheet stacking *i* surrounded by an eddy-current damping system $i_1$. The quadrantal deviation proper is corrected by the provision of bar *j* of which the position and orientation are adjusted by means of another button *k*.

We shall now successively describe the improved compass elements according to this invention namely:

A. Sensitive elements.

B. Corrector magnets.

C. System for reinforcing the director field and/or annuling the constant deflection factor.

D. Field measurement devices.

A. *Sensitive elements*

The sensitive element or member is of finite dimensions. It therefore is not situated in a uniform field and this is particularly true because of the presence of nearby corrector units.

This is a source of proximity harmonics which it is necessary to eliminate; this is achieved by suitably arranging, according to the invention, the sensitive element or the correctors, or preferably both.

According to the invention the sensitive element is formed by a magnetic element having the form of a body of revolution and presenting throughout its entire volume magnetization of the same intensity J and of the same direction, said direction being perpendicular to the axis of revolution of said magnetic element.

This magnetization is obtained by positioning the sensitive member in an induction field produced between pole pieces having a suitably determined shape.

If a material characterized by a low permeability and a high coercive force, for example a ferrite or oxid substance such as $Fe_2O_3$—CO—O is used, and if the induction field is relatively strong, the desired result may be achieved by simply giving to this induction field a spatial distribution similar to that of the above-defined magnetization.

If an ellipsoidal sensitive body of revolution or a sensitive body of revolution having the shape of a flat disk—which behaves like an ellipsoid as far as magnetization is concerned—is used, a uniform magnetization $\vec{J}$ of constant magnitude and direction (the latter being at right angles to the axis of the sensitive member) will be obtained, provided that the sensitive member is magnetized in a uniform induction field. This result will be obtained irrespective of the magnetic permeability of the material employed. Thus, for instance, an aluminum-nickel-cobalt alloy such as 14 Ni, 8 Al, 24 Co, 3 Cu may be used.

With this specific arrangement of the sensitive member any proximity harmonics will be damped out completely and as a result the torque produced by a stationary magnetic body on the sensitive member will be a sinusoidal function of the angle $\alpha$ of rotation of this sensitive member about its axis. That is to say all the terms in sin $p\alpha$ and cos $p\alpha$ ($p$ being an integer other than 1) of the development into a Fourier's series of the torque value in terms of $\alpha$, are null. Therefore, these elements will be called hereafter "sinusoidal elements." If the sensitive element 14 is a body of revolution the cross section of which in a plane passing through the axis of revolution has any desired shape, and if the body has a uniform magnetization J perpendicular to the axis of revolution (Figs. 3–4), a simple calculation shows that along the axis of revolution there are two points at which the magnetic field produced by this element is zero. The distance from the point of zero field to the center is a function of the ratio of the radii $R/r$ which distance tends toward $R/\sqrt{2}$ as $R/r$ tends towards unity.

Then sensitive element comprising a body of revolution as above defined may be constituted by a magnetic powder. By embedding this powder 15 (Figs. 5, 5*a* and 6, 6*a*) in a body such as a hollow torus 16 of a non-magnetic substance **15*a***, which can be a material presenting a suitable density, one can construct a fluid compass without a float.

As a matter of fact, the sensitive element according to the invention having the form of a body of revolution will be dynamically balanced with respect to the centre O in a very accurate manner.

Figure 3:
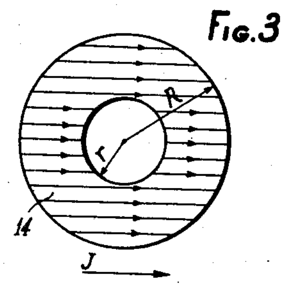
Figs. 3 and 4 are plan and elevational views respectively of a correcting or sensitive element having the form of a body of revolution.
Figure 2:
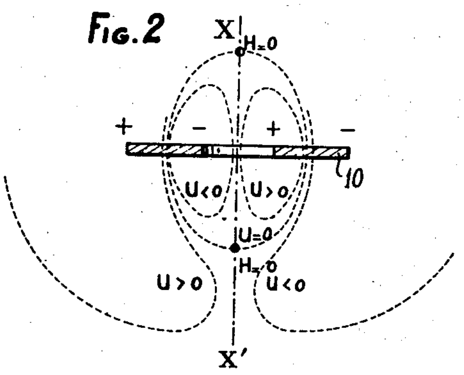
Fig. 2 is a diagram relating to a sensitive or correction element, illustrating the equipotential curves of the field distribution in a vertical section.

The device of Figure 3, in the general case where the elementary units do not intersect the axis of revolution of the sensitive element, behaves as a system comprising two concentrical differential sensitive elements; in other words, it is merely necessary to consider on the one hand the poles spaced along the internal circumference, and on the other hand, the poles spaced along the external circumference. This arrangement which will be termed "differential" herein, is characterized by the following properties:

Considering the potential U of the field H produced by this sensitive element, there exists, at a finite distance, in addition to the plane of symmetry, an equipotential surface $U=0$ (Fig. 2) which intersects the axis of symmetry $XX^1$ at two points at which the field of the sensitive elements 10 is at all times zero and where a magnetic charge leaves the sensitive element undisturbed. In the vicinity of those points, the field is weak and reverses its direction as one moves along the axis of symmetry. Area $U=0$ hereinabove has a form of revolution about $XX^1$.

This property makes it possible:

(1) To use corrector magnets (semi-circular and heeling-error correctors), the correction-amplitude of which is varied from zero or even from either side of the zero point, by means of slight displacements, in a direction parallel to the axis, from either side of any of the zero-field points.

(2) To make use of the zero-field points in order to place thereat the one or more pivots, spindles, ball-bearings, etc., which consequently no longer need be made of a non-magnetic material.

Other expedients may also be used to remove further away from the centre of the sensitive element the points of zero field in order to reduce yet further, all other things remaining equal, the intensity of the field in the vicinity of those points. Thus for instance two sinusoidal sensitive elements of different diameters placed in opposition may be used, or alternatively two coaxial sinusoidal sensitive elements having different moments and situated in opposition in different planes. Figure 18 shows the two elements 120 and 121 as well as the corrector 122 located as indicated above adjacent one of the points of the axis, common to the two elements, where the magnetic field is zero. One of these sensitive elements may, in fact, be made of soft iron and magnetized by the other one to which the compass card is secured. In this case, the soft-iron element may be stationary. A similar expedient is applicable to corrector magnets. The fixed soft-iron element, or the sensitive element, may serve through magnetic attraction to offset the force of gravity acting on the other one.

B. *Corrector magnets*

Insofar as harmonics are concerned the corrector magnets for semi-circular correction constitute a system coupled with the sensitive element.

According to the invention, to annul the harmonics, or their effects on the sensitive element, arrangements may be employed for the correcting magnets that are in all respects similar to those described in connection with the sensitive element.

More specifically, use can be made of:

(1) Differential corrector units having points of zero-field, by placing in the vicinity of these points either the sensitive element or the quadrantal-error correctors or both.

(2) Correctors 17 (Fig. 7) in the form of ellipsoids of revolution, adapted to be magnetized in a strictly uniform manner when the inductor field utilized for the initial magnetization of these correctors is itself uniform. These correctors are then altogether similar, from the magnetic point of view, to the sensitive element defined hereinabove.

The amplitude or the phase of the useful effect of the corrector units may be varied by displacing the elements of one of said corrector units with respect to the centre O of the sensitive element, for example, by a translation along the axis and/or rotation around the axis of revolution $XX^1$ of the element 17 (Fig. 7).

C. *Systems for reinforcing the director field and annulling the constant deflection term*

In the case of certain compass applications, as in conning towers, tanks, submarines, the average value of the earth's field is low and there may be an appreciable constant deviation, the constant coefficient being given by Archibald Smith's well-known formula.

It has already been attempted to use astatic systems such as four identical soft-iron parts disposed spaced at 90° to one another around the sensitive element to overcome this drawback; such attempts however had to be given up since with the methods known and used up to date, it was necessary to employ remotely-located, and therefore prohibitively cumbersome elements to get rid of the phenomena due to harmonics, hysteresis and saturation. These phenomena resulted in the systems used accomplishing more harm than good (producing deflections impossible to compensate for and variable in value according to the direction of motion of the vehicle in which the compass was mounted).

According to the invention it is now possible to avoid all these drawbacks.

(1) The astatic system will consist of elements made of magnetic material of constant permeability arranged symmetrically to cancel the fundamental term and thus render the whole system astatic since the sinusoidal sensitive element, owing to its specific arrangement, will cancel any harmonics.

(2) The arrangements according to the invention will be used which have already been described, and which, as already stated make it possible to eliminate the effects of saturation (for example by placing the elements in the vicinity of a point of zero field).

By way of example, (Figs. 8–8*a*) a combination of mutually orthogonal quadrantal correctors may be used, located in a common plane, thereby constituting an astatic system which annuls the quadrantal torque of those correctors, while reinforcing the effect on the average field.

Figure 8:
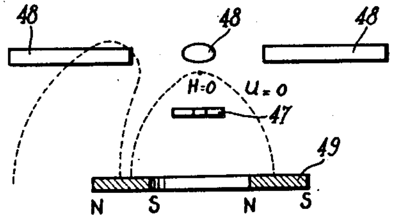
Figure 8A:
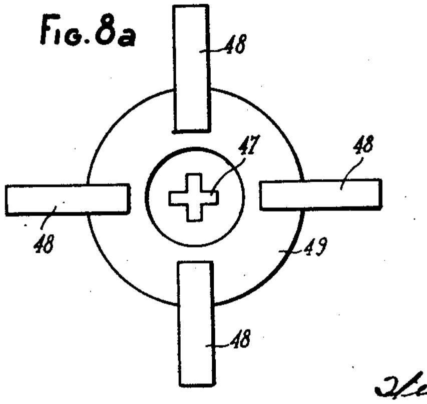

There may be used an astatic system 47, or an astatic system 48, or both, as shown. The system 48 of Figs. 8–8*a* is constituted by elements external to the equipotential surface of revolution $U=0$ of a differential sensitive element 49; in order that these elements 48 shall reinforce the earth's field, they must not traverse the axis of the sensitive element. The system 47 comprises only elements internal to this equipotential surface. They reinforce the earth's field when they intersect the axis of the sensitive element.

As a limit case, where it is merely desired to increase the average field value, an astatic system 50 will be provided, according to the invention. This system 50 (Figs. 9–9*a*) consists of two superposed rings. Each ring is formed of strips of magnetic material, parallel to one another and separated by intervals of non-magnetic material. Thus the induction in each of these two rings is much greater when the earth's field is parallel to these bands than when it is perpendicular thereto. Each ring then behaves substantially like two axially aligned rods not passing through the axis. Like the two rods, it produces therefore, under the action of the earth's field, a quadrantal field and a constant field reinforcing the earth's field.

By utilizing two superposed rings for which the respective directions of the strips are orthogonal, the quadrantal field is annulled, whereas the constant reinforcing field is doubled.

More generally, it is possible to arrange *n* pairs of identical superposed rings formed as above described, in which the bands are positioned by pairs in angular directions $\alpha_i$ and $-\alpha_i$, in respect to a same plane passing through the compass axis, such that:

$$\Sigma \cos 2\alpha_i = 0$$

Figure 10:
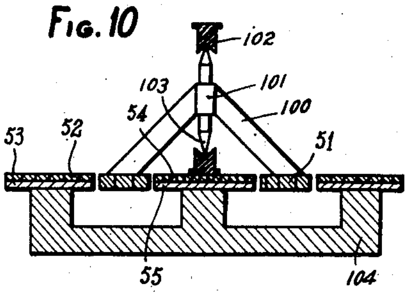
Figure 10A:
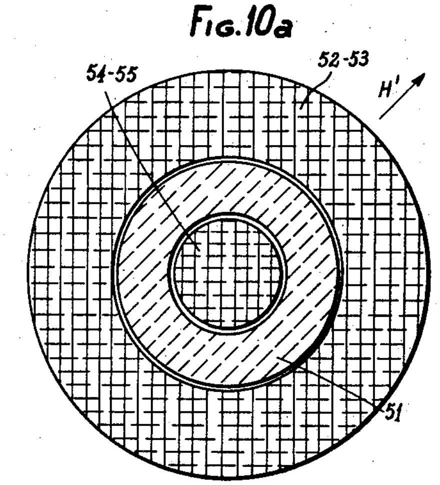

Figures 10–10*a* show an example of such an arrangement of the sensitive element 51 fixed by means of the four arms 100 upon a spindle 101 mounted between the pivots 102, 103. The astatic system represented at

52, 53 and and 54, 55 is fixed upon the fixed portion 104 of the compass. The sensitive element 51 as well as the system 52, 53, 54 and 55 forms geometrically a body of revolution (a flat disc and flat rings) and the sensitive element and the astatic system are formed as described above with respect to element 50 of Figure 9.

D. *Field measurement devices*

One method for measuring field values is to create at the location of the sensitive element a field of known intensity and compare it with the field to be measured, either by anaulling the latter (zero-method) or measuring the deflection produced by the known field. It is desirable that such device should not produce proximity harmonics, either on the sensitive element, or by induction in the soft-iron correctors.

The invention enables such harmonics to be annulled through the use of the arrangements described in paragraphs A and B (sensitive element and corrector magnets).

The conventional field-measuring devices do not allow of effecting field measurements with accuracy in the presence of the quadrantal-error correctors, the Flinders bars and the astatic systems, since the field induced by them therein alters the magnitude to be measured and alters it in a variable degree depending on the intensity and direction of said magnitude with respect to the above mentioned correcting means.

To overcome these serious drawbacks, it is possible to use, as the magnetic structure of the measuring device, two systems of magnets having a common axis of rotation concident with that of the compass.

Said assembly may be so determined that the induction produced thereby on the soft-iron corrector assembly will exert a zero influence on the compass card.

Fig. 11 illustrates by way of example one arrangement in which the two sets of magnets are concentric and consist both of differential systems. In this figure, the equipotential surface $U=0$ of the magnetic structure of the measuring device, respectively 57 and 58, may be caused to pass through the sensitive element 56, for example by displacing along the revolution axis the assembly 57, 58, or one of its component elements 57 or 58, so that the magnetic torque acting on 56 may be varied continuously about the zero value. The measuring devices may also be so devised that the Flinders bars will be so located that they will be adjacent to a substantially rectilinear and vertical portion of an equipotential line of said device, so that this measuring device introduces no considerable field into the Flinders bars, which would result in false measurement.

The measuring device 57—58 according to the invention, that is to say free of any proximity harmonics, may be placed directly upon the compas-glass very close to the compass card.

Under such conditions, even if the soft-iron correctors are not close to the equipotential surface $U=0$ they lie within a field that is much weaker than that which the measuring device exerts on the compass-card. The induction from said device in the soft-iron elements is then negligible.

The amplitude of the field produced by the magnets 57—58 may be adjusted according to any one of the means described above in connection with the corrector magnets, and in particular by rotating the two systems of magnets with respect to each other around the common axis of revolution.

Finally, use may be also made of the property according to which the fields produced by the two systems do not have the same law of amplitude variation over the whole extent of the common axis, especially where both said systems do not lie in a common plane so as to make said measuring device adapted for use in connection with any desired type of compass. In order to adapt this measuring device to a compass of any given type, it will be sufficient to put the two magnet systems of the measuring device in opposition and without touching the orientation of the two magnet systems to adjust the device in height relative to the sensitive element so that no deviation is produced. The measuring device is thus placed at a suitable height relative to the compass, and it will then be possible to effect the measurement by orientating the two magnet systems in relation to one another so as to produce a pre-determined deviation.

E. *Exemplary embodiments of various elements of the compass*

(1) Sensitive elements—

Figure 4:
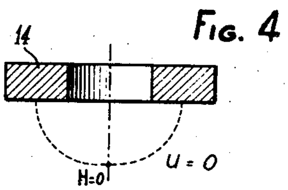

(*a*) Homogeneous structure in the form of a body of revolution for magnetic compass:

Figs. 3 to 6 illustrate a differential sinusoidal structure. In Figs. 3 and 4, said structure comprises a torus 14 of magnetic metal uniformly magnetized, the magnetisation vector J being normal to the axis of revolution. A structure 67 of such type is illustrated in Figs. 12 and 13 as mounted in a float 68 for a fluid type of compass, by way of example. The float 68 is limited at the exterior by a semispherical surface carrying at its upper portion the pivot 105. The pivot 105 is fixed upon the interior surface of revolution 114 of the float. This surface 114 which constitutes the support of the sensitive element 67 carries the dial 107. Said float is shown as having the requisite volume for buoyancy with a minimum external area, in order to reduce error due to sway by the fluid in the course of the evolutions of the vessel or vehicle on which the compass is mounted.

Figure 5:
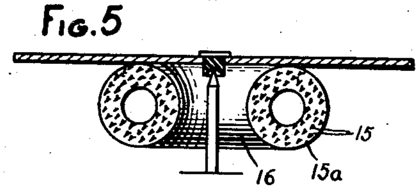
Figure 5A:
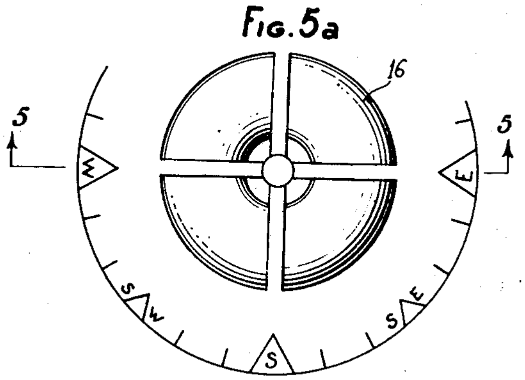
Figure 6:
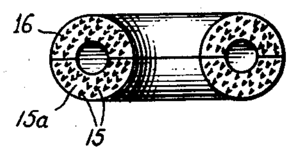
Figure 6A:
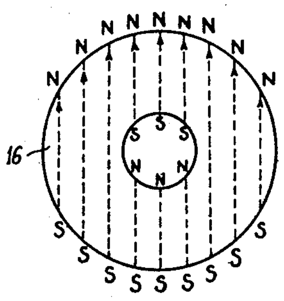

In Figs. 6–6*a* there is shown a torus magnetized as indicated above and made of magnetic metal, which may either be immersed in a susbtance of appropriate specific gravity, or have appropriate shape, or both, in order that the buoyancy of the entire structure shall enable the float to be omitted. Figs. 5 and 5*a* illustrate a general view of the sensitive element in this instance. The magnetic element chosen by way of example is formed by a powder 15 spread in a non-magnetic material 15*a*, for example, an expanded plastic material of suitable density. Upon Figures 5–5*a* and 6–6*a* the magnetic element formed by the elements 15 and 15*a* has the form of a hollow torus of revolution whose generating surface is constituted by a ring located between two concentric circumferences. The dial 16 (Figures 5–5*a*) is fixed upon such toric element concentrically to the axis of the torus.

(*b*) Magnetic compass structure coupled with an astatic field-reinforcing system:

Figs. 9–9*a*, 10–10*a* and 14 illustrate: (1) a sensitive element according to the invention (49 or 51) which may either be a magnetic structure of the type hereinbefore described, or else in the form of a body of revolution (disc or annulus) made of a susbtance having a high magnetic permeability (such as known under the registered trademark "Mu Metal") parallel to a diameter (as by lamination, or molecular orientation of the constituent matter, like certain ferro-nickel alloys the magnetic permeability of which is much greater in the direction in which it was rolled than in the direction at right angles thereto, or the like).

The magnetic permeability of the said disc or the like is greater in a direction parallel to a definite diameter thereof than in a direction perpendicular to this diameter. This may be realized in various ways, for example by making the disc of magnetic strips or wires parallel to one and same diameter, the space between the strips or wires being filled with non-magnetic material. It is also possible to make the disc of oriented magnetic powder, i. e. powder treated in such manner that it has a direction of magnetization along one diameter of the disc. Such discs, having a main direction of magnetization according to one diameter thereof may therefore be termed "magnetically unidirectional." Therefore, this disc having a form of revolution will be magnetized uniformly under the influence of a terrestrial magnetic field ($\vec{J}$=constant) in a direction parallel to that of the magnetic orientation. It is therefore similar throughout to the magnetic elements such as 14 (with $r=0$) (Fig. 3). Such an arrangement serves a threefold purpose: greatly reducing reluctance in the direction of the orientation, eliminating proximity harmonics produced by the neighboring magnetic masses and reducing hysteresis.

Figure 9:
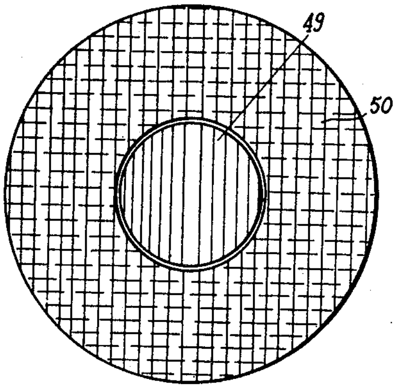
Figure 9A:
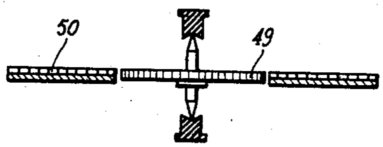

(2) A field reinforcing system comprising, in the particular embodiment of Figs. 9–9*a*, a pair of discs of revolution 50 (Figs. 9–9*a* and 14) and 52—53—54—55 (Figs. 10–10*a*), said system being made of orientated discs in superposed relationship the direction of the orientation of two successive disc being orthogonal. These discs are made of a substance having high magnetic permeability and constant magnetic susceptibility in the range of variations of the magnetic field acting on them.

Where the sensitive element is made of a substance of constant magnetic susceptibility (such as known under the registered trademark "Mu Metal"), the magnetic moment which it takes on by the induction of the earth's field reinforced by the astatic system is proportional to the horizontal component H of this field; the quadrantal field due to the induction of this sensitive element will therefore be proportional to H and the correction will be maintained when the vessel or vehicle moves over the surface of the sea or ground. The system therefore behaves like an ordinary compass for which the induction from the sensitive element in the quadrantal-error correctors has been compensated, that is, the correction of the quadrantal deviation or error is independent of the magnetic latitude.

By way of example, the quadrantal-error correction field-reinforcing system may be an assembly of two discs in superposed relationship in the direction of greater magnetic permeability disposed at 90° from each other if the quadrantal error is zero, and at an angle which departs from 90° as the quadrantal to be corrected increases in value.

The annular sensitive element 51 in Figs. 10–10*a* has the advantage of increasing the diameter of the movable element while retaining, for given weight and thickness values, the same value for the oscillation period in the same director field. This follows immediately from the fact that, neglecting the gaps between the sensitive element and the discs and rings, the assembly including the sensitive element and reinforcing system behaves as a single, highly oblate ellipsoid which, as is known, becomes uniformly magnetized in a uniform field. Thus, the sensitive element itself may constitute a compass-dial of suitable diameter.

Finally, the induction may be increased in the entire system by constructing this latter as a plurality of elements in superposed relationship in as great a number as possible for a given total thickness. Fig. 14 illustrates such an arrangement (in this figure, for greater convenience of illustration, the thicknesses have been considerably exaggerated). The reference number 70 indicates a damping device using eddy-currents. The arrangement 70 is mounted upon the casing 108 by the supports 109.

It is pointed out that in order to remove the 180°-ambiguity in the case where the sensitive element is free from permanent magnetization, a small magnetized element 71 of low magnetic moment may be used, arranged over the main element, the degree of accuracy of this auxiliary element being of little consequence.

(*c*) Eddy-current damping:

Figs. 15 and 16 show by way of example in what manner, depending on whether a spindle with one pivot 72 (Fig. 15) or with two pivots 73 (Fig. 16) is used, the sensitive elements 74 may be arranged so as to be damped by the action of the eddy-currents induced within the copper masses having the shape of bodies of revolution 75 and 76. The sensitive element 74 is mounted upon the pivot by arms such as 110. The dial is represented at 111.

2. Corrector magnets—

The corrector units for semi-circular correction may for instance take the form of oblate ellipsoids uniformly magnetized, parallel to the equatorial plane thereof, or of any one of the magnet arrangements according to the invention, used in connection with the sensitive element. A single corrector 17 (Fig. 7) may be used which is displaced along the axis X—X[1] of the compass in the vicinity of the point of zero field in order to vary the amplitude of the correction, its phase being varied by rotation about its axis, or else two elements whose individual actions on the sensitive element have the same amplitude and the resultant effect of which is varied by rotating elements forming the corrector one with respect to the other. Fig. 17 illustrates a corrector comprising two elements 77—78 whereof the relative rotation with respect to each other is controlled by an adjusting member such as a knob 79. To vary the phase, the assembly will be rotated as a whole through the desired angle. Finally, the highly oblate ellipsoids may be replaced by flat discs practically equivalent thereto with respect to their magnetic characteristics.

This application is a continuation-in-part of the abandoned patent application Ser. No. 10,902 filed on Feb. 25, 1948.

What we claim is:

1. A magnetic field sensing or measuring element having the form of a body of revolution and presenting throughout its entire volume a magnetization of the same intensity and of the same direction, said direction being perpendicular to the axis of revolution of said magnetic element.

2. A magnetic field sensing or measuring element as set forth in claim 1 wherein said magnetic element is formed of a plurality of elongated elements oriented so that the magnetic permeability of said magnetic element is greatest in one direction parallel to a diameter.

3. A magnetic compass which comprises a sensitive element constituted by a magnetic element having a toric form and presenting throughout its entire volume a magnetization of the same intensity and of the same direction, said direction being perpendicular to the axis of the torus and at least one corrector element placed in the neighborhood of one of the two points of the axis of the torus where the magnetic field of said sensitive element is zero.

4. A magnetic compass which comprises a sensitive element constituted by two coaxial magnetic elements having different magnetic moments and placed in opposition, each of said elements presenting throughout its entire volume a magnetization of the same intensity and of the same direction, said direction being perpendicular to the common axis and at least one corrector element placed in the neighborhood of one of two points of the common axis where the magnetic field of said sensitive element is zero.

5. A magnetic compass as set forth in claim 4 in which one of said two elements is formed of soft iron.

6. A magnetic compass which comprises a sensitive element and at least one corrector element having the form of a body of revolution and presenting throughout its entire volume a magnetization of the same intensity and of the same direction, said direction being perpendicular to the axis of rotation of said corrector element.

7. A magnetic compass comprising a sensitive element having the form of a body of revolution and presenting throughout its entire volume a magnetization of the same intensity and of the same direction, said direction being perpendicular to the axis of revolution of said magnetic element, a system disposed about said magnetic element reinforcing the field and formed by a plurality of elements in the form of superposed discs of a constant permeability material and of slight hysteresis, said discs having each a principal direction of magnetization and being grouped in pairs, the principal directions of magnetization of the two discs of a pair being symmetrical with relation to a reference plane passing through the axis of revolution of said sensitive element and common to all the pairs of discs.

References Cited in the file of this patent

UNITED STATES PATENTS

| | | |
|---|---|---|
| 22,125 | Kline | Nov. 23, 1858 |
| 103,287 | Bliss et al. | May 24, 1870 |
| 2,563,568 | Wallace | Aug. 7, 1951 |